United States Patent [19]

Yamada et al.

[11] Patent Number: 5,918,251
[45] Date of Patent: Jun. 29, 1999

[54] METHOD AND APPARATUS FOR PRELOADING DIFFERENT DEFAULT ADDRESS TRANSLATION ATTRIBUTES

[75] Inventors: Koichi Yamada, San Jose; Gary N. Hammond, Campbell, both of Calif.

[73] Assignee: Intel Corporation, Santa Clara, Calif.

[21] Appl. No.: 08/771,845

[22] Filed: Dec. 23, 1996

[51] Int. Cl.$^6$ .................................................. G06F 12/00
[52] U.S. Cl. .............................. 711/207; 711/3; 711/205; 395/500; 395/833
[58] Field of Search .............................. 711/207, 3, 205; 395/500, 833

[56] References Cited

U.S. PATENT DOCUMENTS

| | | | |
|---|---|---|---|
| 4,774,659 | 9/1988 | Smith et al. | 395/418 |
| 4,881,075 | 11/1989 | Weng | 341/87 |
| 4,980,816 | 12/1990 | Fukuzawa et al. | 364/200 |
| 5,058,003 | 10/1991 | White et al. | 395/400 |
| 5,060,137 | 10/1991 | Bryg et al. | 395/250 |
| 5,179,674 | 1/1993 | Williams et al. | 395/414 |
| 5,278,963 | 1/1994 | Hattersley et al. | 395/414 |
| 5,307,477 | 4/1994 | Taylor et al. | 711/3 |
| 5,412,787 | 5/1995 | Forsyth et al. | 395/400 |
| 5,418,975 | 5/1995 | Babaian et al. | 395/800 |
| 5,442,766 | 8/1995 | Chu et al. | 395/414 |
| 5,465,337 | 11/1995 | Kong | 395/417 |
| 5,475,827 | 12/1995 | Lee et al. | 395/417 |
| 5,479,627 | 12/1995 | Khalidi et al. | 711/205 |
| 5,493,660 | 2/1996 | DeLano et al. | 395/416 |
| 5,526,504 | 6/1996 | Hsu et al. | 395/417 |
| 5,542,062 | 7/1996 | Taylor et al. | 711/3 |
| 5,561,814 | 10/1996 | Glew et al. | 395/833 |
| 5,652,872 | 7/1997 | Richter et al. | 395/500 |

FOREIGN PATENT DOCUMENTS

| | | | |
|---|---|---|---|
| 0175398 | 3/1986 | European Pat. Off. | G06F 12/10 |
| 0381245 | 2/1990 | European Pat. Off. | G06F 12/10 |
| 0701211 | 9/1995 | European Pat. Off. | G06F 12/10 |

OTHER PUBLICATIONS i750, i860, & i960, Processors and Related Products, Intel Corporation (1993) 7 Pages.

Shanley, et al., "ISA System Architecture, New Revised Edition", vol. 1, pp. 137–156 (1991 & 1993).

Kane, et al., "MIPS RISC Architecure", Prentice Hall, Englewood Cliffs, New Jersey, Ch 6, 57 Pages, CH 4, 30 Pages (1992).

PowerPC 601, RISC Microprocessor User's Manual, Memory Management Unit, Ch 6, Motorola, 63 Pages, (1993).

EPO Search Report, Application No. EP 97 30 3535, dated Apr. 8, 1998.

*Primary Examiner*—John W. Cabeca
*Assistant Examiner*—Nasser Moazzami
*Attorney, Agent, or Firm*—Blakely, Sokoloff, Taylor & Zafman

[57] ABSTRACT

A method and apparatus for streamlining the installation of virtual to physical address translations into a translation unit. According to one aspect of the invention, an apparatus for use in a computer system is provided that generally includes a translation unit, a default attribute storage area, and a preload unit. The translation unit stores translations for translating virtual addresses into physical addresses, and each of these translations includes an attribute field. The default translation attribute storage area stores a number of default translation attributes. The preload unit is coupled to the default translation unit and the translation unit. In response to receiving a signal from the translation unit indicating a translation for a virtual address is not stored in the translation unit, the preload unit transmits the appropriate default translation attribute to the translation unit.

18 Claims, 5 Drawing Sheets

METHOD AND APPARATUS FOR PRELOADING DIFFERENT DEFAULT ADDRESS TRANSLATION ATTRIBUTES

BACKGROUND OF THE INVENTION

1. Field of the Invention

The invention relates to the field of computer systems. More specifically, the invention relates to the area of memory management.

2. Background Information

Memory addressing schemes often use a technique called paging to implement virtual memory. When using paging, the virtual address space (i.e., the address space generated by either the execution unit of a processor or by the execution unit in conjunction with a segmentation unit of a processor) is divided into fix sized blocks called pages, each of which can be mapped onto any of the physical addresses (i.e., the addresses that correspond to hardware memory locations) available on the system. In a typical computer system, a memory management unit determines and maintains, according to paging algorithm(s), the current mappings for the virtual to physical addresses using one or more page tables.

Upon receiving a virtual address from the execution unit of a processor, typical memory management units initially translate the virtual address into its corresponding physical address using the page table(s). Since the page table(s) are often stored in main memory, accessing the page tables is time consuming. To speed up the paging translations, certain computer systems store the most recently used translations in a translation look-aside buffer or TLB (a faster memory that is often located on the processor). Upon generating a virtual address requiring translation, the memory management unit first searches for the translation in the TLB before accessing the page table(s). If the translation is stored in the TLB, a TLB "hit" is said to have occurred and the TLB provides the translation. However, if the translation is not stored in the TLB, a TLB "miss" is said to have occurred and a page miss handler is invoked to access the page tables and provide the translation.

A number of different techniques are used for implementing page miss handlers, including: 1) hardware on the processor to access the page table(s) (referred to as a "hardware page miss handler"); 2) operating system routine(s) whose execution controls the accessing of the page table(s) (referred to as a "software page miss handler"); etc. Certain systems use multiple techniques for handling TLB misses. For example, one system uses a hardware page miss handler to access a hashed page table and a software page miss handler to control the walking of non-hashed page table(s). Thus, the phrase "page miss handler" is used herein to refer to any technique for providing a translation when another address translation unit cannot provide the translation.

When using a software page miss handler, a TLB miss causes the processor to interrupt execution of the current process, store the interrupted process' execution environment (i.e., the information necessary to resume execution of the interrupted process), and execute the software page miss handler to determine the paging translation. Execution of the software page miss handler results in the generation of the translation, and typically the installation of that translation into the TLB. Upon completion of the software page miss handler, the processor resumes execution of the interrupted process.

Certain computer systems are now further dividing the virtual address space into regions of virtual address space using address extensions, where each region can contain one or more pages. Each region is identified by a region identifier (also termed an "address space identifier"). In certain computer systems, N bits of the virtual address are used to identify $2^N$ different regions of virtual address space. Each of the $2^N$ regions may be utilized for any number of different uses. Furthermore, each of the variety of different uses for different regions of virtual memory may have different memory accessing characteristics (e.g., local, global, etc.)

The installation of translations into the TLB is typically performed using one or more TLB installation registers (e.g., a page miss handler stores the translation in the TLB installation register(s) and instructs the processor to install the translation in the TLB). The TLB installation register(s) often include a region identifier field, a translation attribute field, a virtual page number field, and a physical page number field. The translation attribute field is used to store data identifying various characteristics of the page being accessed (e.g., access protection, etc.).

Upon recognition of a page miss, typical computer systems: 1) load the virtual page number and region identifier into the TLB installation register(s); and 2) invoke the page miss handler(s) to load the physical page number and attributes into the TLB installation registers. Although the attributes for pages in a region can vary, the majority of pages in a region often have the same attributes. However, the page handler(s) must load the attributes for each page in a region each time a translation must be installed. Since TLB fills occur at a much higher rate than other types of events (e.g., exceptions, interrupts, operating system calls, etc.), it is desirable that the page miss handler(s) be as streamlined as possible.

SUMMARY

A method and apparatus for streamlining the installation of virtual to physical address translations into a translation unit is described. According to one aspect of the invention, an apparatus for use in a computer system is provided that generally includes a translation unit, a default attribute storage area, and a preload unit. The translation unit stores translations for translating virtual addresses into physical addresses, and each of these translations includes an attribute field. The default translation attribute storage area stores a number of default translation attributes. The preload unit is coupled to the default translation unit and the translation unit. In response to receiving a signal from the translation unit indicating a translation for a virtual address is not stored in the translation unit, the preload unit transmits the appropriate default translation attributes to the translation unit.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to unnecessarily obscure the invention.

Overview

A method and apparatus for streamlining TLB fills is described. In one embodiment, the processor includes a storage area for storing default translation attributes for each of a number of different sets of virtual addresses. In response to a TLB miss, the processor preloads the appropriate default translation attributes for the virtual address into the TLB installation register(s). If the preloaded default translation attributes are correct, the attribute field of the TLB installation register(s) are not loaded by the page miss handler and the performance of the TLB fill is increased. However, if the default translation attributes are incorrect, the page miss handler simply writes the correct attributes over the preloaded default attributes. In an alternative embodiment, the default translation attributes are preloaded directly into an entry of the TLB and the TLB installation registers may or may not be used/present.

One Embodiment of the Invention

Figure 1:
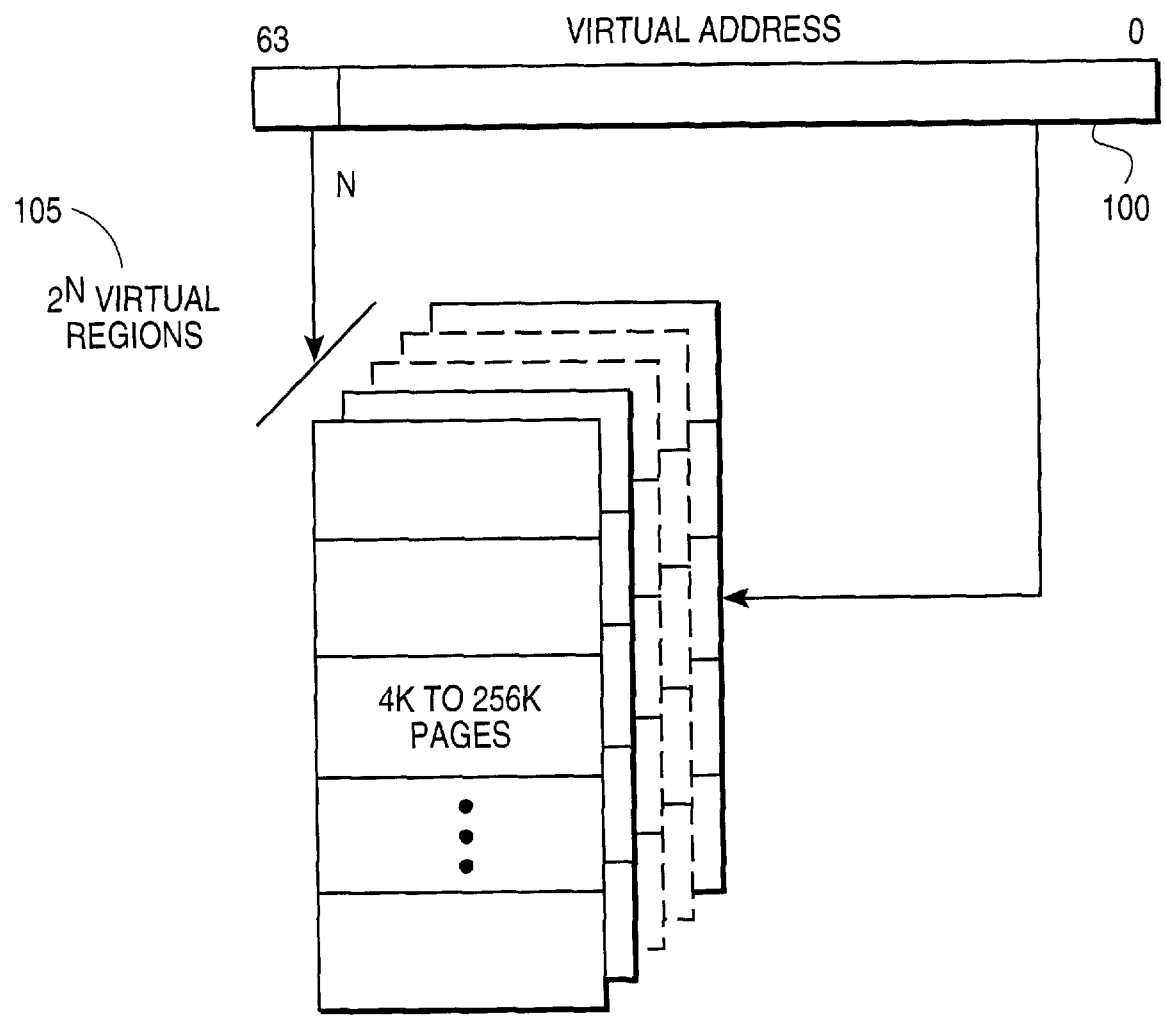
FIG. 1 is a block diagram illustrating the different virtual regions which may be addressed by certain bits of a virtual address according to one embodiment of the invention.

FIG. 1 is a block diagram illustrating the different virtual regions which may be addressed by certain bits of a virtual address. FIG. 1 shows a virtual address 100 having 64 bits numbered 0 to 63. In one embodiment of the present invention, N upper bits of the virtual address 100 are used to identify $2^N$ different virtual regions 105. As shown in the example illustrated in FIG. 1, each of the different virtual regions thus has $2^{64-N}$ bytes of addressable space. While this embodiment is described in relation to a 64-bit computer system, the invention is not limited to a 64-bit computer system.

Different embodiment may assign any number of different attributes to the regions and pages in any number of different ways. For example, different embodiments can break the virtual regions down into pages in any number of different ways (e.g., each virtual regions can contain one or more pages, different regions can contain different size pages, the same region may contain different size pages, etc.) In addition, different embodiments can assign access protection criteria in any number of different ways (e.g., the same protection key may be used for every page in a region, each page may have its own protection key, etc.) Furthermore, different embodiments can handle caching in any number of different ways (e.g., the same caching protocol may be used for every page in a region, each page may have its own caching protocol, etc.) While one embodiment is described in which address extensions are used to identify different regions of virtual space, alternative embodiments need not support different virtual regions.

Figure 2:
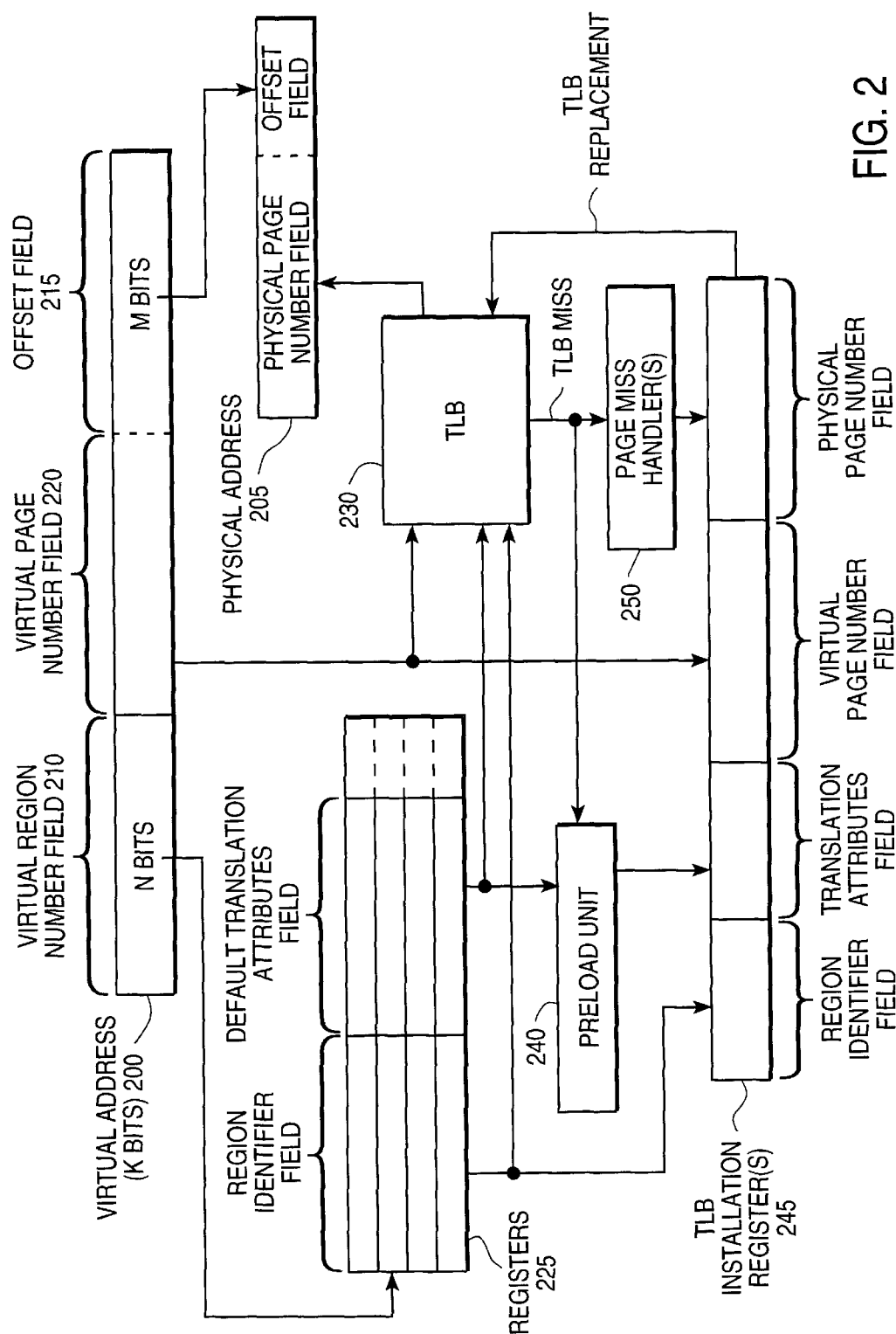
FIG. 2 is a block diagram illustrating an exemplary implementation of one embodiment of the invention.

FIG. 2 is a block diagram illustrating an exemplary implementation of one embodiment of the invention. FIG. 2 shows a virtual address 200 containing K bits and requiring translation into a physical address 205. The virtual address 200 contains a virtual region identifier field 210, a virtual page number field 220, and an offset field 215. The offset field 215 is show containing m bits. In an embodiment in which multiple page sizes are supported (e.g., 4K, 16K, 4M, etc.), the number of bits in the offset field 215 and the virtual page number field 220 depends on the size of the page to which the virtual address belongs. The variable size of the offset is illustrated in FIG. 2 by a dashed line between the offset field 215 and the virtual page number field 220.

In one embodiment, the N bits in the virtual region identifier field 210 are used to identify a register in a set of registers 225. The set of registers 225 includes $2^N$ registers for storing the region identifiers and default translation attributes for each region associated with the process currently being executed. In this embodiment, the set of registers 225 do not necessarily store the default translation attributes for every process being multitasked by a processor. The default translation attributes for regions can be chosen to be different from one process to another. The default translation attributes for the processes currently being multitasked are swapped between main memory and the registers 225 by the operating system. Of course, alternative embodiment could include more or less registers.

As previously stated, alternative embodiments of the invention need not support different virtual regions (i.e., alternative embodiments of the invention do not use the region identifiers as address extensions). Also, while one embodiment is described in which a set of registers is used for storing the default translation attributes and in which the default translation attributes are selected from based on bits in the virtual address, alternative embodiments could store and/or select from the default translation attributes using any number of different techniques. For example, the default translation attributes may be: 1) stored by hardwiring the default translation attributes for certain or all of the regions; 2) stored by hardwiring the default translation attributes for certain or all virtual addresses (including a computer system that does not support virtual regions); 3) stored in a storage area outside of the processor and/or accessed by a software handler; 4) selected from based on the instruction currently associated with a virtual address (e.g., the execution of I/O instructions may result in the selection of one set of default translation attributes, while the execution of non-I/O instructions may result in the selection of a different set of default translation attributes); etc. The phrase "default translation attribute storage area" is used herein to refer to any mechanism for storing the default translation attributes. The phrase "default translation attribute selection criteria" is used herein to refer to any technique for selecting from the default translation attributes in the default translation attribute storage area.

Any number of attributes may be stored as part of the default translation attributes, including a default page size, a default caching protocol, a default protection key, etc. As an example, the default page size for a region would be selected to represent the most commonly accessed and/or occurring page size in that region. By selecting the most commonly accessed and/or occurring page size in that region, the preloaded default page size will more often be the correct page size for a virtual address belonging to that region. While protection keys may be used for any number of purposes, in one embodiment of the invention the protection keys are used to support domain based protection models and to allow single address space operating system models to assign different key identifiers to the protection domains. In one embodiment that uses protection keys as part of the default translation attributes, the default protection key for a region is the region identifier.

Along with the virtual page number of the virtual address 200, the region identifier from the identified one of registers 225 is sent to a TLB 230. The TLB 230 can be implemented in any number of ways (e.g., one or more fully associative caches, one or more direct mapped caches, a combination of fully associated cache(s) and direct-mapped cache(s), etc.). If the TLB 230 contains the translation for the virtual address 200, the physical page number is retrieved from the TLB 230 and concatenated with the m bits from the offset field 215 to generate the physical address 205.

However, if the TLB does not contain the translation for the virtual address 200, a TLB miss fault is generated. In response to the TLB miss fault, a preload circuit 240 preloads a set of TLB installation register(s) 245 with the default translation attributes from the identified register. In addition, a set of page miss handler(s) 250 are invoked to determine the translation for the virtual address. The set of page miss handler(s) 250 represents any number page miss handlers that can be of different types (e.g., a hardware or software page miss handler) and use different techniques (e.g., hashed page tables, different hash functions, linear page tables, etc.). If multiple page miss handlers are provided, any number of techniques may be used for selecting amongst the page miss handlers, including a hierarchy in which a page miss in one page miss handler causes the next page miss handler in the hierarchy to be invoked. Thus, the invention is not limited by the number or type of page miss handlers, nor the techniques used by those page miss handlers.

If the default translation attributes preloaded into the TLB installation register(s) 245 are correct for the translation, then the page miss handler loads the physical page number for the translation into the TLB installation registers, but not the translation attributes. In this manner, the performance of the page miss handler is increased because the translation attributes were not loaded.

However, if the preloaded default translation attributes are incorrect, then the page miss handler must load both the correct translation attributes and the physical page number into the TLB installation register(s) 245. Once the correct translation is stored in the TLB installation register(s) 245, the translation is installed in the TLB 230.

The preloading of the default translation attributes can also be used to reduce the footprint of the page table(s) if all or most of the pages in a virtual region share the same translation attributes. For example, if all of the pages in a virtual region share the same translation attributes, then those common translation attributes need not be stored in each entry of the page table(s) because the common translation attributes will be preloaded from the identified register in the set of registers 225.

While one embodiment is described in which the invention assists in the translation of virtual addresses into physical addresses, in alternative embodiments the invention may be used to assist in the translation of virtual addresses into translated addresses that are subsequently converted into physical addresses. In addition, while one embodiment is described with reference to specific fields (e.g., the virtual page number field 220 includes the virtual region identifier field 210), alternative embodiment may use different fields to implement the invention (e.g., in an alternative embodiment, the virtual page number field may not include or partially overlap the virtual region number field).

The TLB installation register(s) represent any number of registers and need not be limited to the storage of translation data for installation in the TLB 230. For example, the fields represented in the TLB installation register(s) may reside in several different system registers that contain information in addition to translations. In response to the translation being completed, the translation is sent from these several different registers to the TLB 230 for storage in an entry of the TLB 230.

As previously stated, one embodiment of the invention preloads the default translation attributes directly into a TLB entry rather than to the TLB installation register(s). Such an embodiment may or may not include TLB installation register(s). The term "TLB unit" is used herein to refer to a TLB and its associated installation register(s), if any. Thus, the preloading of default translation attributes into a TLB unit refers to either the preloading of any installation register (s) or the preloading of an entry in a TLB.

The term "address translation unit" is used herein to refer to any mechanism in a computer system for translating virtual addresses, including: 1) a TLB unit; 2) a software or hardware page miss handler; etc. The invention is not limited to preloading the default translation attributes for installation into a TLB unit, but may be used for preloading the default translation attributes for installation into any address translation unit (e.g., preloading the default translation attributes in some form of main memory based table storing translations). While one embodiment is described in which the preloading is performed by a preload circuit, alternative embodiments could perform the preloading using software. The term "preload unit" is used herein to refer to any mechanism for preloading default translation attributes for installation into an address translation unit.

Figure 3:
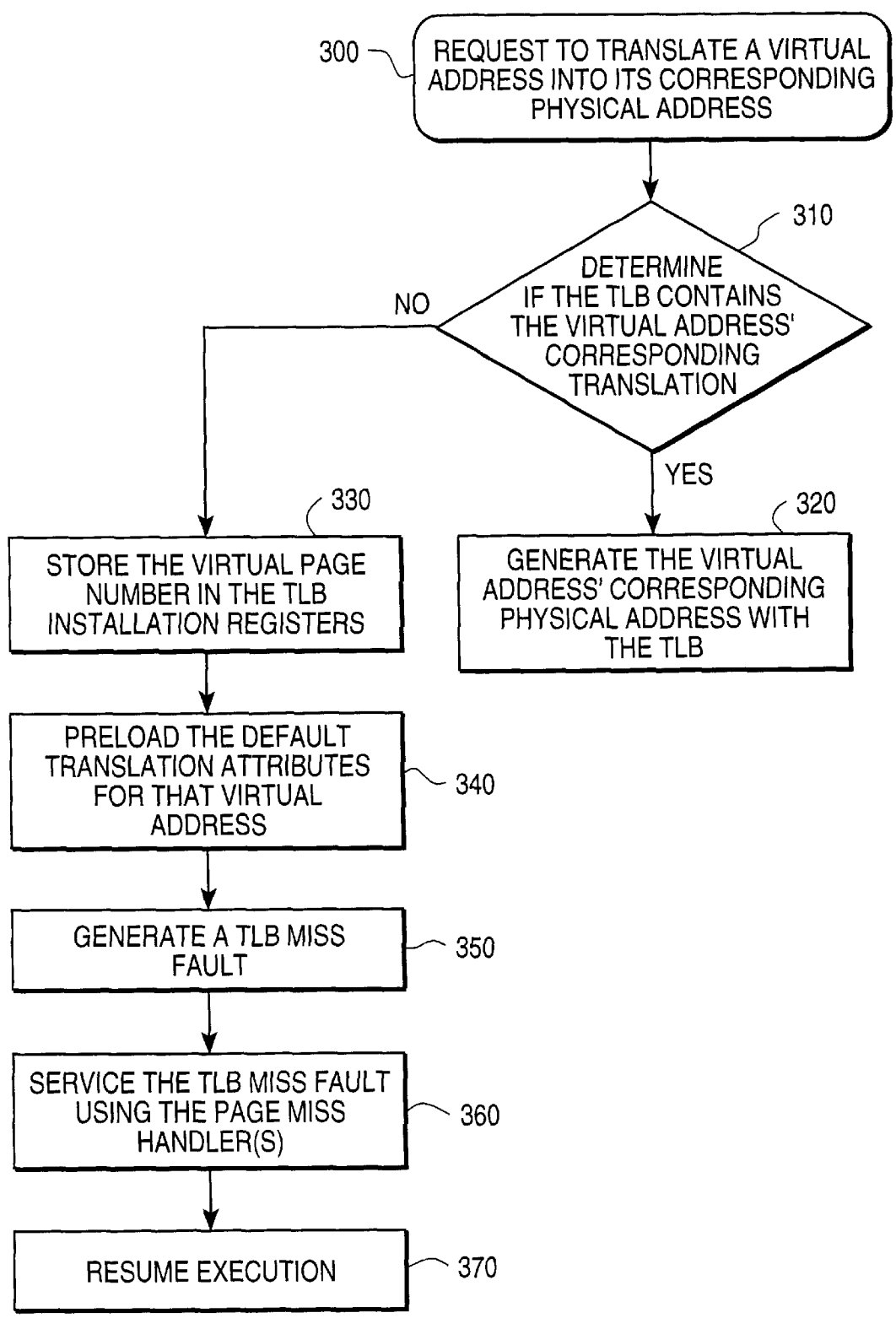
FIG. 3 is a flow diagram illustrating the steps performed in response to a request to translate a virtual address into its corresponding physical address according to one embodiment of the invention.

FIG. 3 is a flow diagram illustrating the steps performed in response to a request to translate a virtual address into its corresponding physical address according to one embodiment of the invention. The flow diagram starts at step 300, from which control passes to step 310.

As shown in step 310, it is determined if the TLB contains the translation for the virtual address. If a match is found, flow passes to step 320 where the virtual address' corresponding physical address is determined using the matching translation and the flow diagram ends. Otherwise, flow passes to step 330.

As shown in step 330, the virtual page number of the virtual address is stored in the TLB installation register(s). From step 330, flow passes to step 340.

As shown in step 340, the default translation attributes for the virtual address are preloaded into the TLB installation register(s). If region identifiers are used, the region identifier for that region may also be loaded into the TLB installation register(s). From step 340, control passes to step 350.

At step 350, a TLB miss fault is generated and flow passes to step 360. The generation and handling of faults is well known in the art. From step 350, control passes to step 360.

As shown in step 360, the TLB miss fault is serviced by the page miss handler(s). In the case of a software page miss handler, the processor interrupts execution of the current process, stores the interrupted process' execution environment (i.e., the information necessary to resume execution of the interrupt process), and invokes the software page miss handler to provide the translation. The page miss handler instructs the processor to store the translation in the TLB installation register(s), install the translation in the TLB, and resume execution of the interrupted process. In the case of a hardware page miss handler, the hardware page miss handler provides the translation (e.g., by accessing page tables, using a hard wired translation, etc.) and/or installs the translation in the TLB. Step 360 will be further described with reference to FIG. 4. From step 360, control passes to step 370.

As shown in step 370, the processor resumes execution of the interrupted process. In the case of a software page miss handler, the processor resumes execution of the interrupted process at the TLB miss fault causing instruction (i.e., the instruction that generated the virtual address described in step 300). In so doing, the same virtual address will again be generated. However, this time the translation will be stored in the TLB. As a result, control will pass through the flow diagram and terminate in step 320 in which the corresponding physical address is determined for the virtual address.

Figure 4:
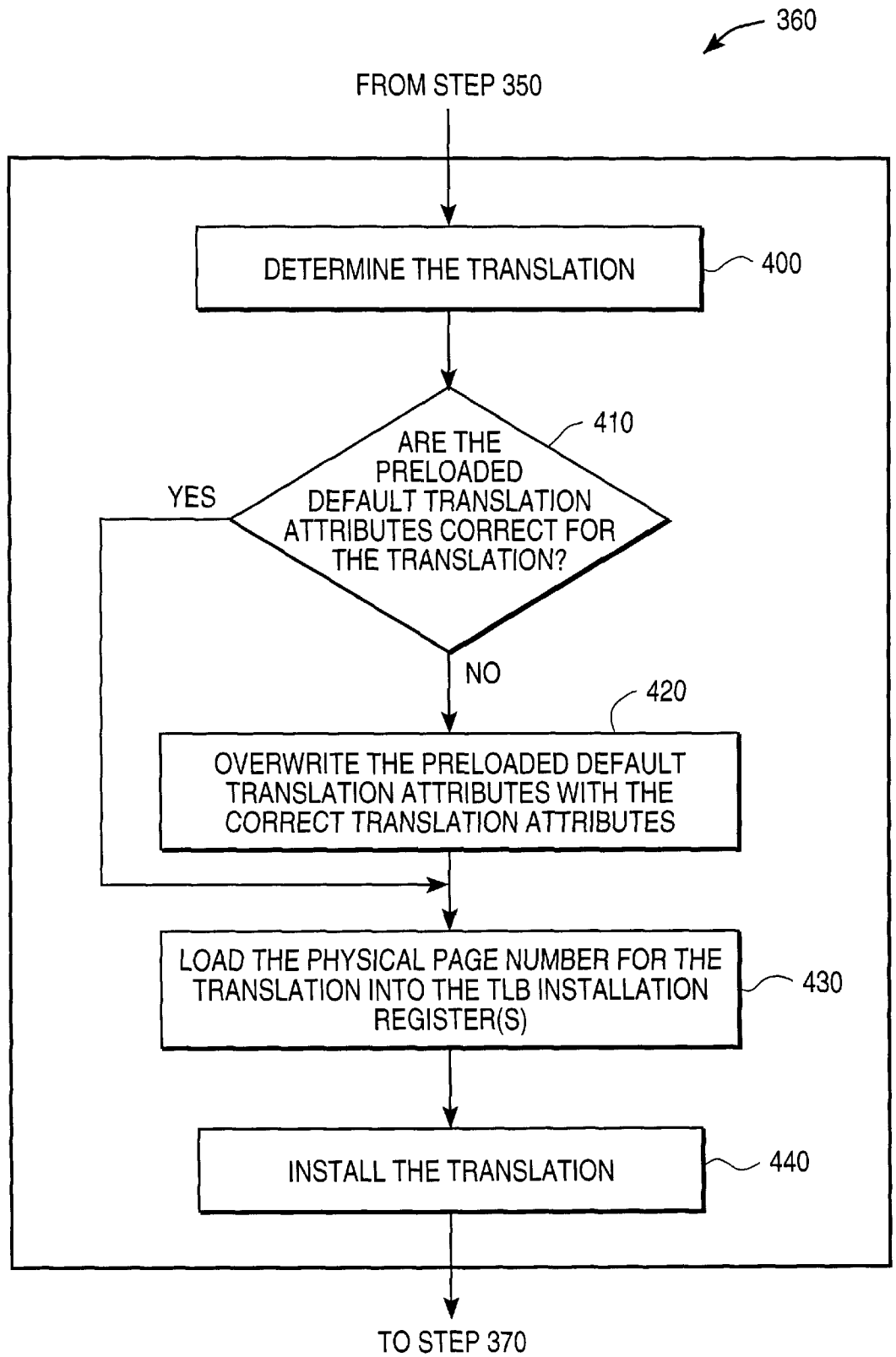
FIG. 4 is a flow diagram illustrating a more detailed description of the steps performed in step 360 of FIG. 3 according to one embodiment of the invention.

FIG. 4 is a flow diagram illustrating a more detailed description of the steps performed in step 360 of FIG. 3 according to one embodiment of the invention. In those cases where a software page miss handler is used, the steps shown in FIG. 4 would be performed in response to the execution of that software page miss handler. From step 350, in which a TLB miss fault is generated, control passes to step 400.

As shown in step 400, the translation for the virtual address is determined and control passes to step 410. Any number of techniques for performing step 400 may be used.

At step 410, it is determined whether the preloaded default translation attributes are correct for the determined translation. If so, flow passes to step 430. Otherwise, flow passes to step 420. In this manner, if the preloaded default translation attributes (which should be the most frequently used attributes) are correct, the TLB fill is streamlined by removing the need to load the attribute part of the translation. Step 410 may be performed using any number of techniques, including: 1) storing data indicating the correct translation attributes (or whether the translation attributes for a given page differ from the default translation attributes) in the entries of the page table(s); 2) implementing the operating system to test for certain address ranges having translation attributes that differ from the default translation attributes; etc.

As shown in step 420, the preloaded default translation attributes stored in the TLB installation register(s) are overwritten with the correct attributes. If multiple default translation attributes are preloaded, different embodiment may selectively overwrite only those attributes that are incorrect. From step 420, flow passes to step 430.

At step 430, the physical page number of the determined translation is loaded into the TLB installation register(s). From step 430, flow passes to step 440.

As shown in step 440, the translation is installed in the TLB and flow passes to step 370. In the case of a software page miss handler, the software page miss handler includes one or more instructions that when executed cause the translation to be installed and the interrupted process to be resumed.

An Exemplary Computer System

Figure 5:
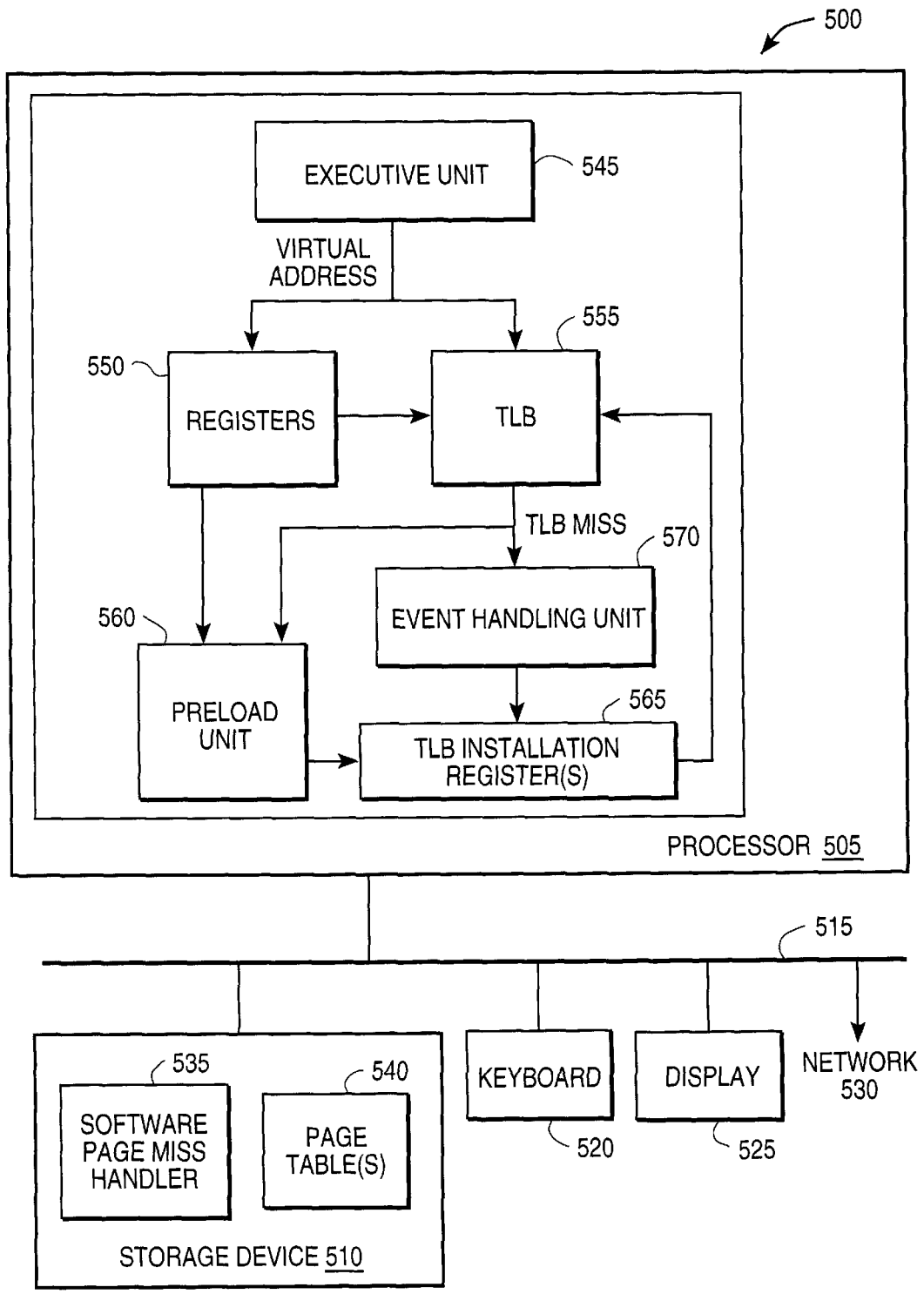
FIG. 5 is a block diagram of an exemplary computer system according to one embodiment of the invention.

FIG. 5 is a block diagram of an exemplary computer system 500 including a software page miss handler according to one embodiment of the invention. The exemplary computer system 500 includes a processor 505 coupled to a storage device 510 by a bus 515. In addition, a number of user input/output devices, such as a keyboard 520 and a display 525, may also be coupled to the bus 515, but are not necessary parts of the invention. A network 530 may also be coupled to the bus 515. The processor 505 represents a central processing unit of any type of architecture, such as a CISC, RISC, VLIW, or hybrid architecture. In addition, the processor 505 could be implemented on one or more chips. The storage device 510 represents one or more mechanisms for storing data. For example, the storage device 510 may include read only memory (ROM), random access memory (RAM), magnetic disk storage media, optical storage media, flash memory devices, and/or other machine-readable media. The bus 515 represents one or more busses (e.g., PCI, ISA, X-Bus, EISA, VESA, etc.) and bridges (also termed as bus controllers). While this embodiment is described in relation to a single processor computer system, the invention could be implemented in a multi-processor computer system.

FIG. 5 also illustrates that the storage device 510 has stored therein a software page miss handler 535 and a set of page tables 540 for determining translations. Of course, the storage device 510 preferably contains additional software such as an operating system and various applications (not shown), which are not necessary to understanding the invention.

FIG. 5 additionally illustrates that the processor 505 includes an execution unit 545, a set of registers 550, a TLB 555, a preload circuit 560, a set of TLB installation register(s) 565, and an event handling unit 570. The execution unit 545 is coupled to transmit field(s) of virtual addresses to the set of registers 550 and the TLB 555 for translation into virtual addresses. The registers 550 and TLB 555 operate in conjunction with the preload circuit 560 and the TLB installation register(s) 565 in a manner similar to that described with reference to FIG. 2.

In response to TLB misses, the event handling unit 570 causes the execution of the software page miss handler 535. The execution of the software page miss handler 535 causes the processor 505 to retrieve translations from the set of page tables 540 and to install those translations in the TLB 555 as described above. The software page miss handler 535 is written to take advantage of the preloading of the default translation attributes when the preloaded default translation attributes are correct.

As previously stated, the invention is not limited by the number or type of page miss handlers, nor the techniques used by those page miss handlers. Thus, while the computer system is shown having a single software page miss handler, alternative embodiments can include any number of software and/or hardware page miss handlers that use any number of different techniques. Specifically, alternative embodiments may have a hardware page miss handler incorporated into the processor in addition to or in lieu of the software page miss handler 535.

While FIG. 5 illustrates a processor having a single TLB, alternative embodiments of the processor can include multiple TLBs (e.g., a data TLB and an instruction TLB) that may share the TLB installation registers or have separate TLB installation registers. The term storage area is used herein to refer to any mechanism for storing data, including locations in a storage device like the storage device 510, one or more registers in a processor, etc.

Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. An apparatus for use in a computer system, said apparatus comprising:

an address translation unit configured to store a plurality of translations for translating virtual addresses into physical addresses, each of said translations including an attribute field to define an attribute for its translation;

a default translation attribute storage unit configured to store a plurality of default translation attributes, each of the default translation attributes being associated with a selected set of virtual addresses and utilized when a translation for a particular virtual address is not present in said address translation unit; and a preload unit coupled to said default translation attribute storage unit and said address translation unit for preloading a corresponding default translation attribute for use by said address translation unit, but having the default translation attribute replaced if not correct for the translation of the particular virtual address.

2. The apparatus of claim 1, wherein each default translation attribute identifies at least one of a page size, a caching protocol, and a protection key.

3. The apparatus of claim 1 further comprising:

a page miss handler coupled to said address translation unit for generation of a physical page number field for the translation when a page miss occurs in said address translation unit.

4. The apparatus of claim 1, wherein said default translation attribute storage area is comprised of a set of registers.

5. A processor comprising:

a translation look-aside buffer for translating a virtual address into a physical address;

a translation look-aside buffer installation storage unit coupled to said translation look-aside buffer and including a translation attribute field to define an attribute when translating the virtual address to the physical address;

a set of registers, each including a default translation attribute field; and a preload unit coupled to said set of registers and said translation look-aside buffer installation storage unit for preloading a corresponding default translation attribute field for use by said translation look-aside buffer installation storage unit for installation into said translation look-aside buffer, but having the default translation attribute field replaced if not correct for the translation of the virtual address.

6. The processor of claim 5, wherein N bits of said virtual address are used to identify a corresponding register in said set of registers having the corresponding default translation attribute field.

7. The processor of claim 5, wherein data stored in said translation attribute field identifies at least one of a page size, a caching protocol, and a protection key associated with a memory.

8. The processor of claim 5 further comprising a page miss handler coupled to said translation look-aside buffer for generation of a page number for the translation when a page miss occurs in said translation look-aside buffer.

9. The processor of claim 5 further comprising an event handling unit coupled to said translation look-aside buffer for invoking a software page miss handler for generation of a page number for the translation when a page miss occurs in said translation look-aside buffer.

10. A computer system comprising:

a processor including,
a translation look-aside buffer for translating a virtual address into a physical address,
a translation look-aside buffer installation storage unit coupled to said translation look-aside buffer and including a translation attribute field to define an attribute when translating the virtual address to the physical address,
a set of registers, each register including a default translation attribute field, and
a preload unit coupled to said set of registers and said translation look-aside buffer installation storage unit for preloading a corresponding default translation attribute field for use by said translation look-aside buffer installation storage unit for installation into said translation look-aside buffer, but having he default translation attribute field replaced if not correct for the translation of the virtual address; and a memory coupled to said processor which is accessed by the physical address generated by the processor.

11. The computer system of claim 10, wherein N bits of said virtual address are used to identify a corresponding register in said set of registers having the corresponding default translation attribute field.

12. The computer system of claim 10, wherein data stored in said translation attribute field identifies at least one of a page size, a caching protocol, and a protection key associated with said memory.

13. The computer system of claim 10 further comprising a page miss handler coupled to said translation look-aside buffer for generation of a page number for the translation when a page miss occurs in said translation look-aside buffer.

14. The computer system of claim 10, said memory having resident therein a software page miss handler for execution by said processor to load a correct translation attribute field when the default translation attribute field is not correct.

15. A method for preloading a translation attribute field for use when translating a virtual address to a physical address comprising:

detecting if a translation for the virtual address is presently available;

selecting one of a plurality of stored default translation attributes as a corresponding default translation attribute for the translation attribute field;

preloading the corresponding default translation attribute when the translation of the virtual address is not presently available to generate a new translation;

using the preloaded default translation attribute if correct, but if not, overwriting it with the correct translation attribute.

16. The method of claim 15 further comprising:

storing a virtual page number for the translation of the virtual address.

17. The method of claim 15, wherein said preloading includes preloading the default translation attribute to identify at least one of a page size, a caching protocol, and a protection key.

18. The method of claim 15 wherein said determining includes executing a software page miss handler.

* * * * *

UNITED STATES PATENT AND TRADEMARK OFFICE
CERTIFICATE OF CORRECTION

PATENT NO. : 5,918,251

DATED : June 29, 1999

INVENTOR(S) : Koichi Yamada, et al.

It is certified that error appears in the above-identified patent and that said Letters Patent is hereby corrected as shown below:

Column 10 line 16, "he" should read --the--.

Signed and Sealed this

Ninth Day of November, 1999

Attest:

Attesting Officer

Q. TODD DICKINSON

Acting Commissioner of Patents and Trademarks